H. W. JOHNSON.
CAMERA.
APPLICATION FILED JULY 14, 1914.
1,156,362.
Patented Oct. 12, 1915.
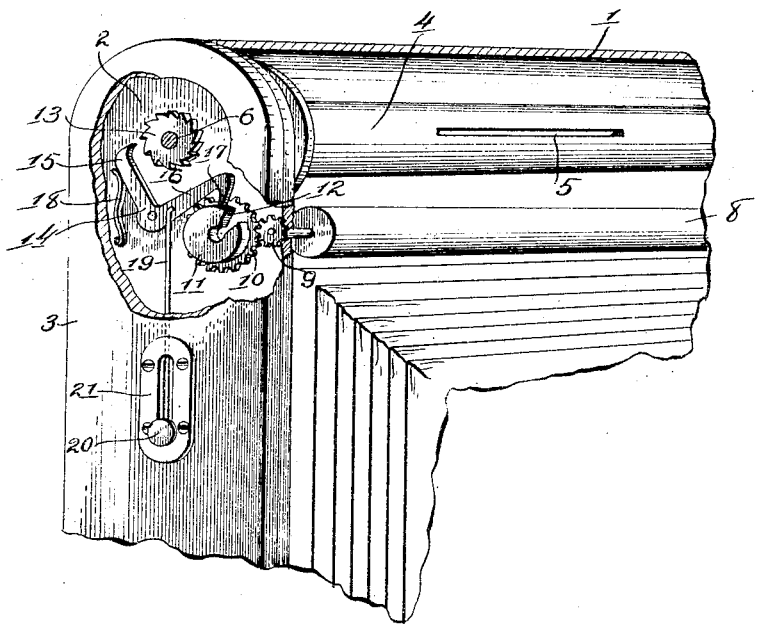
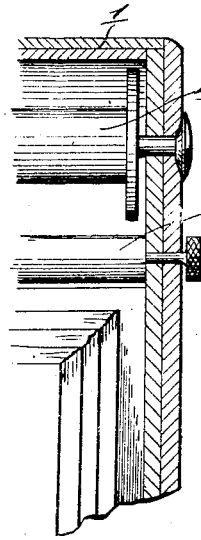
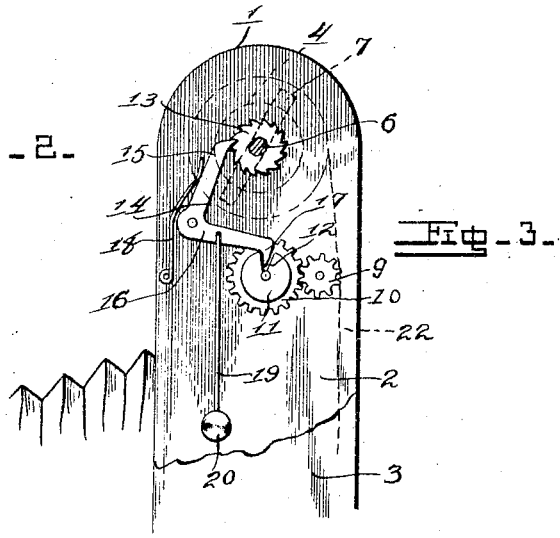
Witnesses
Edw. S. Hall.
Lloyd W. Petch
Inventor
Henry W. Johnson.
By Richard Owen.
Attorney ced be-
UNITED STATES PATENT OFFICE.

HENRY W. JOHNSON, OF OCALA, FLORIDA.

CAMERA.

1,156,362.

Specification of Letters Patent. Patented Oct. 12, 1915.

Application filed July 14, 1914. Serial No. 850,971.

*To all whom it may concern:*

Be it known that I, HENRY W. JOHNSON, a citizen of the United States, residing at Ocala, in the county of Marion and State of Florida, have invented certain new and useful Improvements in Cameras, of which the following is a specification.

The object of my invention is to provide a mechanism which may be fitted to be a part of the film winding means of a camera in which roll films are used, and to so construct the mechanism that after one exposure, the winding roll by which the film is moved to the position for a subsequent exposure can be turned to bring the length of film intended for this exposure to the proper position and the parts will then be locked so that further turning of the winding means is precluded.

A further object is to provide means which will automatically measure the length of film wound onto the winding roll and which will positively stop the winding of the film when the predetermined length has been traversed.

With other objects in view, which will be referred to, my invention consists in the peculiar combination and novel arrangement of parts, such as will be hereinafter more fully described in connection with the accompanying drawings and more particularly pointed out in the appended claims.

In the drawings: Figure 1 is a view in perspective of the winding end of the box of a camera with my invention applied thereto and with parts broken away more clearly to illustrate the structure. Fig. 2 is a fragmentary detail sectional view to better disclose the relative mounting of the different rolls of the mechanism. Fig. 3 is a view in side elevation of the disclosure in Fig. 1 with parts of the box removed to permit a full disclosure of the operating mechanism.

With the roll film camera now in use, the film is secured at its end to a backing strip of opaque paper or other suitable material which is wound onto the spool with the film and is wound onto a second spool to carry the film along from one exposure position to a subsequent exposure position, a small window or opening being provided through the back of the box of the camera at a point adjacent the path of travel of the opaque strip and this strip having numbers thereon to be visible through said window or opening and to indicate to the operator when the film has been wound from the one exposure position to the subsequent exposure position. With such a structure, when winding a film after using an exposure length thereof, considerable care and attention must be exercised to insure that just the proper length of film is wound onto the winding spool and also if the numbers be offset slightly from said opening or be blurred there will be uncertainty regarding the exact position of the number and the exact amount of film wound onto the winding spool.

It is the purpose of my invention to provide a structure which may be manually actuated prior to the winding operation to permit this winding operation and then the winding operation may be accomplished by turning the winding spool as fast as desired and when the proper length of film has been wound thereonto the parts will be locked to prevent a further winding.

The box or case 1 of the camera is made of the usual form and dimension, the prime point of differentiation being that this case has at one side the two walls 2 and 3 provided to be spaced slightly apart and to have a case formed therebetween. The usual winding spool 4 having the slot 5 formed therein to receive the end of the paper backing to secure this paper backing to the spindle of the spool is provided in one end of the case and at the opposite end of the case the usual compartment to receive the spool with film thereon is provided, this part of the structure as it does not form a part of my invention is not being shown here. The usual winding shaft 6 is provided to pass through the sides of the case and be held within one end of the spool 4 to permit turning of this spool to accomplish the winding operation, the winding key 7, as shown in dotted line in Fig. 3, being provided on the outer end of this shaft 6 to permit more ready turning thereof.

In so far as described the parts may be of the standard form and design. A measuring roll 8 which is made somewhat larger than the usual friction roll adapted for this purpose in the standard camera is provided at a point to have the film passed thereover and to hold the film in the proper relation for an exposure. A gear wheel 9 is carried by the shaft on which the measuring roll 8 is secured to be within the case provided between the wall 2 and 3 and a gear 10 is pivoted to the inner wall 2 to mesh with this gear 9. This gear wheel 10 has a disk 11 secured on the outer face thereof and a notch 12 is provided to extend from the periphery of this disk 11 at one point.

A ratchet wheel 13 is secured on the winding shaft 6 to have the engaging faces of the teeth thereof disposed in a direction of rotation of the spool 4 to wind the film thereonto. A dog 14 is pivoted to the member 2 and is provided with the operating arm 15 to engage with the teeth of the ratchet wheel 13, a second arm 16 provided with an engaging shoe 17 being disposed at an angle to said arm 15 and capable of movement to a position that it engages in the notch 12 of the disk 11. A leaf spring 18 is secured to the member 2 to engage with this arm 15 and hold this dog 14 normally in a position that the engaging teeth thereof will be operative and an operating rod 19 is pivotally connected with the arm 16 and at its opposite end is connected with a button 20 which passes through a slot 21 provided in the outer wall 3 of the case, said parts being so arranged that by movement of the button 20 toward the winding key 7 the dog 14 will be moved against the spring 18 to an inoperative position.

In use, the film is threaded over the roll 8 as indicated by the dotted line at 22 in Fig. 3 and the end of the backing strip thereof is passed through the slot 5 in the spool 4 which secures this backing strip through the spool in such relation that upon turning the winding key 7 the film will be wound onto the spindle of the spool 4. This movement of the film over the roll 8 causes the gear wheel 9 to be turned and by the meshing of this gear with the gear 10 the disk 11 is also moved. It will be understood that it is not possible to turn the key 7 to wind the film onto the spool 4 except that the dog 14 be moved against the tension of the spring 18 to an inoperative relation and when the dog has been moved to this position and the winding key is turned to cause the film to be wound onto the spool 4 the movement of the gear wheel 10 causes the disk 11 to be turned to a position that the tooth 17 on the arm 16 of the dog 14 is, through the tension of the spring 18 held against the outer periphery of this disk and the gear wheel 10 is permitted to be turned, likewise this engagement of the tooth 17 with the periphery of the disk 11 holds the arm 15 of the dog 14 out of engagement with the teeth of the ratchet wheel 13 and free turning movement of the key is permitted. The ratio of diameter between the gear wheel 9 and the gear wheel 10 is so arranged that the winding of the film the distance of one exposure causes the gear wheel 10 to make one complete revolution and thus when the parts are set in the relation shown in Fig. 3 and an exposure is made, the button 20 may be raised to a position to disengage the tooth 17 from the notch 12 and the part turned to the relation indicated in Fig. 1, then by releasing the button 20 and continuing the winding of the film by turning the winding key 7 this gear wheel 10 and the disk 11 will be carried around one complete revolution when the tooth 17 will again be engaged in the notch 12 by the tension of the spring 18 bearing against the arm 15 of this dog, also the tooth provided on the arm 15 will engage with the teeth of the ratchet wheel 13 and further winding movement of the shaft 6 will be prevented.

It is usual in winding a film upon the spool from which it is to be unwound onto the spool 4, to provide a considerable length of the backing strip before the film is attached at the outer end. To obtain the proper first adjustment of the operating parts of my invention so that the subsequent operation thereof will be exact to obtain the right length of film for each subsequent exposure, it is perhaps preferable that a line be marked across the backing strip at a point preferably two or three complete exposure lengths before the point of attachment of the film and thus by placing the backing strip at its end in the slot 5 and turning the spool 4 to a sufficient degree this mark or line will be brought across the roll 8. This roll and the gear wheel 9 carried thereby may be turned through the medium of the knurled or scored thumb wheel 23 which is attached to one end of the shaft on which the roll 8 is mounted to a position that the gear wheel 10 is moved to have the tooth 17 engaged in the notch 12 of the disk 11. The back of the camera may then be closed and the turning of the wheel 10 to make one complete revolution so that the tooth 17 will be again engaged in the notch 12 will insure that an exposure length of the film has been wound onto the spool 4 and that an unexposed exposure length is in the proper relation behind the lens of the camera. The operation of the several parts has been set forth as the description of the structure has progressed and it is not believed that further elaboration will be necessary.

From the foregoing, it will be seen that I have provided a structure with which the winding key can be turned as fast as desired without the least fear of passing the proper exposure length as is the case with the present method, and further it is not necessary that the same attention and regard be given to the exact length of film which has been wound.

While I have hereinbefore set forth that it is perhaps desirable that the film be especially constructed for use with this mechanism, it will be understood that the standard film provided with the usual numbers thereon can be just as easily adapted for use, and in the use of such a film the film roll will be placed in position in the ordinary manner, the winding key is turned to a position that the first number appears through the window or opening in the back of the case of the camera and then by turning the thumb wheel 23 to a position that the tooth 17 of the dog 14 is engaged in the notch 12 of the disk 11 it is insured that subsequent exposure lengths of the film which may be gaged by the mechanism of my invention will be in the proper relation and excessive winding of the film onto the spool is prevented.

While I have herein shown and described one specific form of my invention, it will be understood that slight changes might be made in the form and arrangement of the several parts without departing from the spirit and scope of my invention and hence, I do not wish to be limited thereto except for such limitations as the claims may import.

I claim:—

1. A camera comprising in combination, a case provided with a double wall at one side thereof and said walls spaced apart, a winding roll mounted within the case and provided with a winding key extending through the double walled portion to be accessible from the exterior of the case, a measuring roll mounted within the case to have the film bear thereagainst during the winding operation to cause turning of said measuring roll, means mounted between the double walled portion to be actuated by said measuring roll upon winding of the proper length of film upon said winding roll to stop movement of the winding roll, and manually operable means connected with said stop means and extending through the outer wall of the case to be accessible to permit actuation to release said stop means.

2. A camera comprising in combination, a case provided with a double wall at one side thereof and said walls spaced apart, a winding roll mounted within the case and provided with a winding key extending through the double walled portion to be accessible from the exterior of the case, a measuring roll mounted within the case to have the film bear thereagainst during the winding operation to cause turning of said measuring roll, means mounted between the double walled portion to be actuated by said measuring roll upon winding of proper length of film upon said winding roll to stop movement of the winding roll, manually operable means connected with said stop means and extended through the outer wall of the case to be accessible to permit actuation to release said stop means, and means connected with said measuring roll to permit setting of the same to measure the predetermined length of film from any given point thereon.

3. A camera comprising in combination, a case provided with a double wall at one side thereof and said walls spaced apart, a winding roll mounted within the case and provided with a winding key extending through the double walled portion to be accessible from the exterior of the case, a measuring roll mounted within the case to extend parallel with said winding roll in a relation that the film passes thereover and causes turning of the measuring roll during the winding operation, a ratchet wheel mounted on the spindle of said winding roll to be inclosed within the double wall portion, a gear wheel mounted adjacent the spindle of the measuring roll, a gear wheel carried by said spindle to mesh with said first gear wheel, a slotted disk carried by said first gear wheel, a bell crank shaped lever mounted within the double wall portion to have one end thereof bear against said slotted disk, and at the opposite end provided with a dog to engage with the teeth of the ratchet wheel upon registry of the slot of the disk with the end swung adjacent thereto and to thus stop turning movement of the winding roll in a direction to wind the film thereonto.

4. A camera comprising in combination, a case provided with a double wall at one side thereof and said walls spaced apart, a winding roll mounted within the case and provided with a winding key extending through the double walled portion to be accessible from the exterior of the case, a measuring roll mounted within the case to extend parallel with said winding roll in a relation that the film passes thereover and causes turning of the measuring roll during the winding operation, a ratchet wheel mounted on the spindle of said winding roll to be inclosed within the double wall portion, a gear wheel mounted adjacent the spindle of the measuring roll, a gear wheel carried by said spindle to mesh with said first gear wheel, a slotted disk carried by said first gear wheel, a bell crank shaped lever mounted within the double wall portion to have one end thereof to bear against said slotted disk, and at the opposite end provided with a dog to engage with the teeth of the ratchet wheel upon registry of the slot of the disk with the end swung adjacent thereto and to thus stop turning movement of the winding roll in a direction to wind the film thereonto, and means connected with one of the arms of said lever and extending through a slot provided in the exterior wall to be manually moved to release said lever from the ratchet engaged position.

5. A camera comprising in combination, a case provided with a double wall at one side thereof and side walls spaced apart, a winding roll mounted within the case and provided with a winding key extending through the double walled portion to be accessible from the exterior of the case, a measuring roll mounted within the case to extend parallel with said winding roll in a relation that the film passes thereover and causes turning of the measuring roll during the winding operation, a ratchet wheel mounted on the spindle of said winding roll to be inclosed within the double wall portion, a gear wheel mounted adjacent the spindle of the measuring roll, a gear wheel carried by said spindle to mesh with said gear wheel, a slotted disk carried by said first gear wheel, a bell crank shaped lever mounted within the double wall portion to have one end thereof bear against said slotted disk, and at the opposite end provided with a dog to engage with the teeth of the ratchet wheel upon registry of the slot of the disk with the end swung adjacent thereto and to thus stop turning movement of the winding roll in a direction to wind the film thereonto, means connected with one of the arms of said lever and extending through a slot provided in the exterior wall to be manually moved to release said lever from the ratchet engaged position, and means carried by said measuring roll to permit manual movement thereof to measure the length of film from any predetermined point along the length thereof.

In testimony whereof I affix my signature in presence of two witnesses.

HENRY W. JOHNSON.

Witnesses:
J. E. GATES,
WILLIAM VAN A. GREENE.